Jan. 15, 1946.   R. H. BROADMAN   2,393,139
REPLACEMENT GUIDE FOR TOILET FLUSH VALVES
Filed June 29, 1943
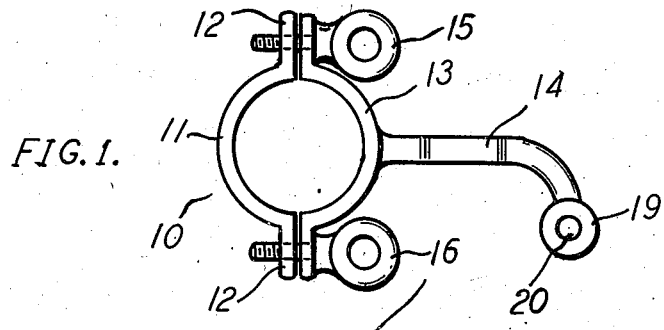
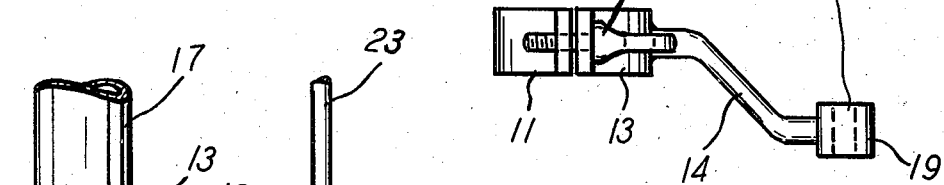
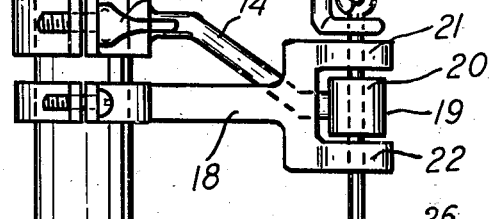
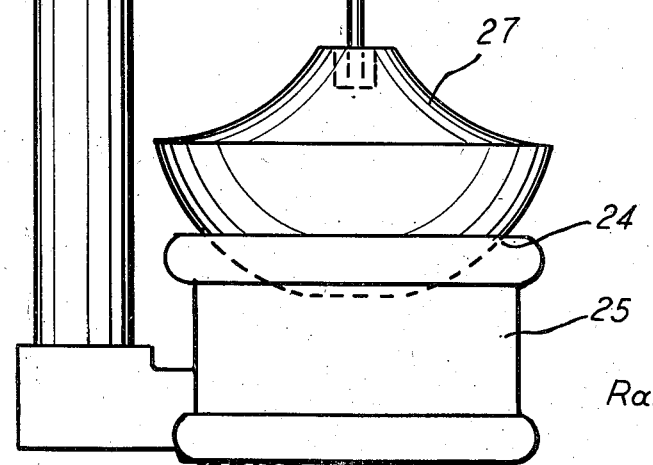
INVENTOR,
Ralph Harvey Broadman
BY Charles Fiandaca,
his ATTORNEY Patented Jan. 15, 1946

2,393,139

UNITED STATES PATENT OFFICE 2,393,139

REPLACEMENT GUIDE FOR TOILET FLUSH VALVES

Ralph Harvey Broadman, Rochester, N. Y.

Application June 29, 1943, Serial No. 492,709

6 Claims. (Cl. 4—57)

The present invention relates to flush tank valves and more particularly to a guide for the stem of the flush valve.

An object of the invention is to provide a replacement bearing guide element for the stem of the rubber tank ball of a toilet flush tank which can be secured to the stand pipe of the tank without losing the axial alignment of the existing guide in reference to the valve seat.

A further object is to provide adjustable means on such a replacement guide so as to make the same adaptable to various sizes of flush tank valves.

A still further object is to provide a replacement guide of this character which will be simple in construction, inexpensive to manufacture, comprising few parts, easily assembled, and highly efficient in use.

To these and other ends, the invention resides in certain improvements and combinations of parts, as will be hereinafter more fully described, the novel features being pointed out in the claims at the end of the specification.

When the flush valve of a toilet tank leaks, the rubber flush valve ball is ordinarily replaced. If the valve continues to leak, the ball valve seat is scraped to dislodge particles which prevent tight seating of the ball. If, after this, the valve still leaks, then the entire valve and standpipe unit are replaced.

This unit replacement is a waste and is not necessary, however, since close study and observation have demonstrated that the faulty seating, if not due to a defective ball or valve seat, is due to misalignment of the stem of the rubber ball valve, that is, the bearing of the guide arm in which the ball stem reciprocates vertically, is badly worn, thereby causing the stem to tip to one side, allowing the ball to be carried sideways by the gravitating level of the water in the tank. Thus, when the ball descends with the level of the flushed water, seating of the ball occurs eccentrically of the valve seat, thereby allowing the water to continue to leak through the valve.

Removing the old stem guide from the stand pipe and putting another in its place, gives rise to further cause of leakage due to the difficulty of locating the guide bearing concentrically over the valve seat, for usually the tank is in an awkward location; and the plumber, relying on his eye to clamp the new guide concentrically over the valve, will misjudge the center and render the misalignment even worse.

The new guide of the present invention, being provided with an easily bent portion between the clamp and bearing, is adaptable to many sizes and types of flush tanks and is universally applicable as a replacement unit.

The old guide may be left in place on the standpipe and the new guide clamped either over or under the old one. By so doing, the bearing of the new guide can be located concentrically with the old one, the easily bent portion which is preferably initially of a goose-neck shape, being bent to the necessary concentric adjustment. Thus, the difficult task of centering the bearing in which the ball stem reciprocates, is made easy, with greater speed, and accurately.

In the drawing:

Fig. 1 is a top plan view of the novel guide.

Fig. 2 is a side elevation of the guide shown in Fig. 1, and

Fig. 3 is a fragmentary side elevation view of the novel guide clamped to the standpipe of a toilet tank, the flush valve, standpipe and flush arm 23 being shown in broken section.

Referring to the drawing, wherein like numerals denote like parts, the novel guide 10 consists of a clamping member 11 preferably made of two parts, the threaded part 12 and the guide portion 13, from which the arm 14 extends laterally and vertically in goose neck fashion. Eyebolts 15 and 16 pass through diametrically spaced openings in one part of the clamp 13 and threadedly engage the other part 12 of the clamp 11, so that the clamp may be removably and adjustably secured to the various sizes of standpipes or overflow tubes 17 found in toilet tanks.

As illustrated in Fig. 3, the clamp 11 may be secured above an already existing valve arm guide 18 so as to fit the bearing portion 19 of the novel clamp within its yoke shaped opening to align their respective bearing bores 20, 21, and 22. Clamp 11 may be secured in other positions along the standpipe than that illustrated, the clamp permitting adjustment vertically or circumferentially, and the easily bent goose-neck arm 14 permitting similar adjustment of the bearing 19 so as to center its bore relatively to the valve opening 24 of the flushing valve 25.

The easily bent portion 14 forming the goose-neck connection between clamp 11 and bearing 19 is preferably made of soft copper so as to resist corrosion and remain in whatever bent position desired when adjusted for centering the bearing 19.

To use the invention, eyebolts 15 and 16 are adjusted to position and tighten the clamp 11 in place on the standpipe after bearing 19 has been approximately positioned with its bore 20 in axial alignment with the bores 21 and 22 of the worn out guide. The stem 26 or a nail of similar diameter is then inserted into bores 20, 21, and 22, and if the stem does not reciprocate with a free sliding fit due to misalignment of the bores, the bearing 19 is forced in the required direction. This forcing is easily accomplished with the hands or pliers because goose-neck arm 14 easily yields to such forcing and retains its newly bent form.

When the guide bearing 19 has thus been aligned so as to allow the stem 26 of ball 27 to reciprocate and guide the ball 27 to rest concentrically on its valve seat 24, the old guide may either be left in place or removed, with the certainty that the original factory-built concentricity of the stem 26 in relation to valve seat 24 will be retained.

Having thus described the invention what is claimed is:

1. A replacement guide for flush tank valves and the like, comprising a soft, metallic, flexible arm, a clamping element at one end thereof, for clamping to a flush tank standpipe, and a bearing at the other end, bored for receiving a reciprocating valve stem, said arm having a sufficient ductility to be manually bent and twisted into any desired shape, and in any direction, whereby said bearing may be manually aligned with the existing valve stem guide after the clamping element has been secured to the flush tank stand pipe.

2. A replacement flush tank valve guide comprising a removable clamp, a bearing laterally spaced from said clamp, and a soft, easily bent and twisted metallic arm bendable in any direction, connecting said clamp and bearing, said arm being bent into a gooseneck shape so as to offset said bearing axially and vertically of said clamp whereby the bearing may be located above, below, or within a bifurcated, worn out existing valve guide.

3. In a toilet flush tank having a flush valve and stand pipe, a replacement flush tank valve guide of the character described, adaptable for use in conjunction with the worn out valve stem guide of the toilet tank flush valve and comprising a clamp; a bearing laterally spaced from said clamp; and a manually bendable semi-rigid arm, bendable for adjustment in any direction, connecting said clamp and bearing; said arm being initially bent laterally and into a goose neck shape horizontally for approximate initial positioning and alignment of the bearing adjacent the worn bearing of the tank, when clamped to the standpipe and whereby the bends may be straightened or accentuated to lengthen or shorten the space between the clamp and bearing.

4. A replacement guide arm for installation in a toilet flush tank of the type having a substantially vertical overflow tube and a substantially vertical valve stem spaced lateraly from the overflow tube, said guide arm including a clamping portion for encircling said overflow tube to be supported thereby, a bearing portion for encircling and guiding said valve stem, and a connecting portion joining said clamping portion to said bearing portion, said connecting portion being offset vertically so that said clamping portion is at a different elevation from said bearing portion, and also being so shaped in a horizontal direction as to connect with a side of said bearing portion other than the side facing said clamping portion, so that said guide arm may be applied to a toilet tank with its bearing portion between the spaced bearing portions of a conventional forked-type guide arm without removing the conventional guide arm from the toilet tank.

5. A replacement guide arm for installation in a toilet flush tank of the type having a substantially vertical overflow tube and a substantially vertical valve stem spaced laterally from the overflow tube, said guide arm including a bearing portion for encircling and guiding said valve stem in a position adjacent a pre-existing worn guide arm, a supporting arm extending laterally from said bearing portion in a direction at a substantial angle to a straight line drawn from said bearing portion to said overflow tube, so as to avoid interference with a pre-existing worn guide arm, and thence extending toward said overflow tube, and a clamping portion for encircling said overflow tube to be supported thereby, said supporting arm being connected to and supported by said clamping portion, said supporting arm having a portion inclined to a horizontal plane so that said bearing portion and said clamping portion are offset vertically with respect to each other.

6. A construction as described in claim 4, in which said connecting portion is of semi-rigid construction, sufficiently flexible to be forcibly bent during installation, to alter the position of said bearing portion relative to said clamping portion, and sufficiently rigid to retain its position when subjected to the usual forces encountered in normal use.

RALPH HARVEY BROADMAN.